United States Patent Office 3,732,323
Patented May 8, 1973

---

3,732,323
METHOD OF PRODUCING 3-PHENYL-1-BUTENE
Atsumu Osaki, Tokyo, Tsutomu Mizoroki, Yokohama, and Ken-Ichi Maruya, Tokyo, Japan, assignors to President of Tokyo Institute of Technology, Tokyo, Japan
No Drawing. Filed Mar. 10, 1972, Ser. No. 233,778
Claims priority, application Japan, July 28, 1971, 46/56,650
Int. Cl. C07c 3/18
U.S. Cl. 260—668 B     8 Claims

ABSTRACT OF THE DISCLOSURE

A method of selectively producing 3-phenyl-1-butene by codimerization of styrene with ethylene in the presence of boron trihalide and δ-aryl nickel(II) halide.

BACKGROUND OF THE INVENTION

As listed in the following table, there are several isomers of phenylbutene. In this specification, 1-phenyl-1-butene, 1-phenyl-2-butene and 4-phenyl-1-butene are generally referred to as "1-phenylbutene," and 2-phenyl-1-butene, 2-phenyl-2-butene and 3-phenyl-1-butene are generally referred to as "2-phenylbutene."

1-phenylbutene and 2-phenylbutene produce respectively 1-phenylbutadiene $$\left[\underset{\bigcirc}{CH=CHCH=CH_2}\right]$$

and 2-phenylbutyldiene $$\left[\underset{\bigcirc}{CH_2=CCH=CH_2}\right]$$

by its dehydrogenation.

1-phenylbutadiene is not so useful in the industries, but 2-phenylbutadiene (also called phenoprene) is useful because it is raw material of the synthetic rubber. Therefore, 2-phenylbutene which is starting material of phenoprene is important compound. Nevertheless, preferred methods of producing 2-phenylbutene have not been found yet.

A method of producing 2-phenylbutene, in which rohdium chloride is used as a catalyst, has been disclosed in Journal of the American Chemical Society [87:24] Dec. 20, 1965, p. 5,642. However, in this method, high pressure is required for codimerization of styrene with ethylene.

It is, therefore, an object of the present invention to provide a method of producing 2-phenylbutene under mild conditions.

TABLE

| | Isomers of phenylbutene | |
|---|---|---|
| 1 | CH=CHCH₂CH₃ 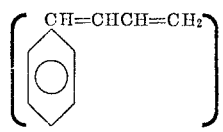 | Cis-1-phenyl-1-butene.<br>Trans-1-phenyl-1-butene. |
| 2 | CH₂CH=CHCH₃ 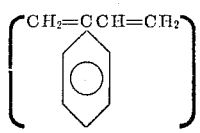 | Cis-1-phenyl-2-butene.<br>Trans-1-phenyl-2-butene. |
| 3 | CH₂CH₂CH=CH₂ | 4-phenyl-1-butene. |
| 4 | CH₂=CCH₂CH₃ | 2-phenyl-1-butene. |
| 5 | CH₃C=CHCH₃ | Cis-2-phenyl-2-butene.<br>Trans-2-phenyl-2-butene. |
| 6 | CH₃CHCH=CH₂ | 3-phenyl-1-butene. |

SUMMARY OF THE INVENTION

The present invention relates to a method of selectively producing 3-phenyl-1-butene in the presence of a mixture of the following compounds (A) and (B):

(A) a boron compound selected from the group consisting of boron trifluoride, boron trichloride and boron tribromide.

(B) a nickel compound selected from the group consisting of δ-aryl nickel(II) halides having the following general formula:

$$\underset{\underset{P\phi_3}{|}}{\overset{\overset{P\phi_3}{|}}{R-Ni-X}}$$

wherein R is an aryl radical, said R being linked to the Ni-atom by δ-bond, φ is a radical selected from the group consisting of ethyl and phenyl, Pφ₃ being tertiary phosphine, and X is halogen selected from the group consisting of chlorine, bromine and iodine, said P and X being linked to the Ni-atom by coordination bond.

Said boron compounds (boron trihalides) are well known to those skilled in the art and, for example, that boron trifluoride ethyl etherate is used as a catalyst in the cationic polymerization, is also well known.

Said nickel compounds (δ-aryl nickel(II) halides) are disclosed in Journal of Chemical Society 1960, p. 1,718 by J. Chatt and B. L. Show.

We have found that codimerization of styrene with ethylene takes place to produce selectively 3-phenyl-1-butene by using a mixture of the above boron trihalide and δ-aryl nickel (II) halide as a catalyst. The present invention is based on this discovery.

Said boron trihalides are used dissolving them in an organic solvent. Said solvent includes, for example, ethyl ether, methylene chloride, chloroform, toluene, xylene chlorobenzene. Boron trifluoride is used in a state of boron trifluoride ethyl etherate.

Preferred δ-aryl nickel(II) halides are bis(triphenylphosphine) δ-aryl nickel(II) halide having the general formula "RNi(Pφ₃)₂X" wherein R is o-tolyl, 1naphthyl or mesityl, P is phosphorus atom, φ is phenyl and X is chlorine, bromine or iodine.

Said δ-aryl nickel(II) halides can easily be synthesized and have high activity to codimerize selectively styrene with ethylene at a low temperature.

On the other hand, δ-aryl nickel(II) halides wherein aryl is, for example, m- or p-tolyl, 2-naphthyl and styryl, may also be used as a catalyst of the codimerization of styrene with ethylene, while they are easy to decompose in comparison with the aforementioned δ-aryl nickel(II) halides.

δ-aryl nickel(II) halide is used in the ratio of 1 to 100 parts by mole, preferably 2 to 20 parts by mole of δ-aryl nickel(II) halide to 100 parts by mole of boron compound.

Codimerization of styrene with ethylene may be carried out as follows:

Bis(triphenylphosphine) δ-aryl nickel(II) halide and boron trihalide are dissolved in methylene chloride under nitrogen gas and to this solution is added styrene. After the solution has been cooled to a temperature of about 0° C., nitrogen gas is removed, and into this solution is introduced ethylene gas having a pressure of 1 atm. while stirring and maintaining the solution at a temperature of about 0° C.

In the above procedure, 3-phenyl-1-butene is first produced and then, as the reaction time is prolonged, 3-phenyl-1-butene is isomerized to 2-phenyl-2-butene. In addition to this, as the reaction time is further prolonged, ethylene is dimerized to butene, and furthermore 3-methyl-3-phenyl-1-pentene is gradually produced by codimerization of 2-phenyl-2-butene with ethylene.

On the other hand, the other undesirable compounds such as diphenylbutenes and styrene polymers are produced by carrying out the codimerization of styrene with ethylene at an elevated temperature above 25° C., for example, at 30° C.

Therefore, in order to produce selectively 3-phenyl-1-butene, it is required that the reaction is carried out at a low temperature in a short time. The reaction temperature is preferably from −10° C. to 20° C.

The catalyst comprising δ-arylnickel (II) halide and boron trihalide can catalyze to codimerize styrene with ethylene so that 3-phenyl-1-butene may selectively be produced at a lower temperature than room temperature and at an ordinary pressure such as 760 mm. Hg.

DESCRIPTION OF THE PREFERRED EMBODIMENTS

The following examples are given for purposes of illustration only and it is to be understood that the present invention is not restricted thereto.

Example 1

0.75 g. (1 mmole) of trans-bis(triphenylphosphine) o-tolyl nickel(II) bromide (trans-o-$C_6H_4(CH_3)$)Ni[P($CH_6H_5$)$_3$]$_2$Bf)

and 0.14 g. (1 mmole) of boron trifluoride ethyl etherate ($BF_3 \cdot O(C_2H_5)_2$) were dissolved in 30 ml. of methylene chloride under nitrogen gas in 100 ml. flask and then to this solution was added 1.8 g. (17.4 mmoles) of styrene. After the solution was cooled to about 0° C., nitrogen gas was removed and into the solution was introduced ethylene gas having a pressure of 1 atm. for 15 minutes while stirring and maintaining the solution at a temperature of about 0° C. At the end of the 15 minute period of introducing ethylene gas, the reaction was stopped by adding an aqueous solution of potassium hydroxide.

0.95 g. (7.2 mmoles) of 3-phenyl-1-butene was obtained in a 58% yield, consuming 1.29 g. (12.4 mmoles) of styrene.

Example 2

The same procedure as that set forth in Example 1 was repeated except that 0.79 g. (1 mmole) of trans-bis(triphenylphosphine) 1-naphthyl nickel(II) bromide (trans-1-$C_{10}H_7$Ni[P($C_6H_5$)$_3$]$_2$Br)

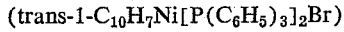

was used in place of 0.75 g. of trans-bis(triphenylphosphine) o-tolyl nickel(III) bromide.

1.36 g. (10.3 mmoles) of 3-phenyl-1-butene was obtained in a 80% yield, consuming 1.34 g. (12.9 mmoles) of styrene.

Example 3

The same procedure as that set forth in Example 1 was repeated except that 0.78 g. (1 mmole) of trans-bis(triphenylphosphine) mesityl nickel(II) bromide (trans-1,3,5-$C_6H_2(CH_3)_3$Ni[P($C_6H_5$)$_3$]$_2$Br) was used in place of 0.75 g. of trans-bis(triphenylphosphine) o-tolyl nickel(II) bromide.

1.53 g. (11.6 mmoles) of 3-phenyl-1-butene was obtained in a 91% yield, consuming 1.29 g. (12.4 mmoles) of styrene.

Example 4

0.079 g. (0.1 mmole) of trans-bis(triphenylphosphine) 1-naphthyl nickel(II) bromide, (trans-I-$C_{10}H_7$Ni[P($C_6H_5$)$_3$]$_2$Br)

and 0.14 g. (1 mmole) of boron trifluoride ethyl etherate ($BF_3 \cdot O(C_2H_5)_2$) were dissolved in 30 ml. of methylene chloride under nitrogen gas in 100 ml. flask and then to this solution was added 3.6 g. (35 mmoles) of styrene. After the solution was cooled to about 0° C., nitrogen gas was removed and into the solution was introduced ethylene gas having a pressure of 1 atm. for 15 minutes while stirring and maintaining the solution at a temperature of about 0° C. At the end of the 15 minute period of introducing ethylene gas, the reaction was stopped by adding an aqueous solution of potassium hydroxide.

3.7 g. (28 mmoles) of 3-phenyl-1-butene was obtained in a 90% yield, consuming 3.2 g. (31 mmoles) of styrene.

Example 5

The same procedure as that set forth in Example 4 was repeated except that 0.29 g. (2.0 mmoles) of boron trifluoride ethyl etherate ($BF_3 \cdot O(C_2H_5)_2$) was used in place of 0.14 g. (1 mmole) of it.

4.0 g. (30 mmoles) of 3-phenyl-1-butene was obtained in a 94% yield, consuming 3.3 g. (32 mmoles) of styrene.

Example 6

The same procedure as that set forth in Example 4 was repeated except that 0.25 g. (1 mmole) of boron tribromide ($BBr_3$) was used in place of 0.14 g. (1 mmole) of boron trifluoride ethyl etherate.

2.5 g. (19 mmoles) of 3-phenyl-1-butene was obtained in a 66% yield, consuming 3.0 g. (29 mmoles) of styrene.

Example 7

The same procedure as that set forth in Example 4 was repeated except that 0.084 g. (0.1 mmole) of trans-bis(triphenylphosphine) 1-naphthyl nickel(II) iodide (trans-1-$C_{10}H_7$Ni[P($C_6H_5$]$_2$I) was used in place of 0.079 g. (0.1 mmole) of trans-bis(triphenylphosphine) 1-naphthyl nickel(II) bromide.

3.4 g. (26 mmoles) of 3-phenyl-1-butene was obtained in a 81% yield, consuming 3.3 g. (3.2 mmoles) of styrene.

Example 8

The same procedure as that set forth in Example 4 was repeated except that 0.060 g. (0.1 mmole) of trans-bis(diethylphenylphosphine) 1-naphthyl nickel(II) bromide (trans-1-$C_{10}H_7$Ni[P($C_2H_5$)$_2C_6H_5$]$_2$Br) was used in place of 0.079 g. (0.1 mmole) of trans-bis(triphenylphosphine) 1-naphthyl nickel (II) bromide.

3.7 g. (28 mmoles) of 3-phenyl-1-butene was obtained in a 88% yield, consuming 3.3 g. 32 mmoles) of styrene.

In Example 1 to 8, δ-aryl nickel(II) bromide or iodide was used. However, δ-aryl nickel(II) chloride may also be used in the same manner and it can give an effect similar to that of bromide or iodide.

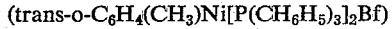

In Example 6, boron tribromide was used, while borontrichloride may be used in place of boron tribromide.

What is claimed is:

1. A method of selectively producing 3-phenyl-1-butene comprising carrying out the codimerization of styrene with ethylene in the presence of a mixture of the following compounds (A) and (B):
   (A) a boron compound selected from the group consisting of boron trifluoride, boron trichloride and boron tribromide,
   (B) a nickel compound selected from the group consisting of δ-aryl nickel(II) halide having the following general formula:

wherein R is an aryl radical, said R being linked to the Ni-atom by δ-bond, $\phi$ is a radical selected from the group consisting of ethyl and phenyl, $P\phi_3$ being tertiary phosphine, and X is halogen selected from the group consisting of chlorine, bromine and iodine, said P and X being linked to the Ni-atom by coordination bond.

2. A method as defined in claim 1 wherein said boron compound is boron trifluoride ethyl etherate.

3. A method as defined in claim 1 wherein said boron compound is boron tribromide.

4. A method as defined in claim 1 wherein said nickel compound is trans-bis(triphenylphosphine) o-tolyl nickel(II) bromide.

5. A method as defined in claim 1 wherein said nickel compound is trans-bis(triphenylphosphine) 1-naphthyl nickel(II) bromide.

6. A method as defined in claim 1 wherein said nickel compound is trans-bis(triphenylphosphine) mesityl nickel(II) bromide.

7. A method as defined in claim 1 wherein said nickel compound is trans-bis(diethylphenylphosphone) 1-naphthyl nickel(II) bromide.

8. A method as defined in claim 1 wherein said codimerization of styrene with ethylene is carried out at a temperature between −10° C. and 20° C.

References Cited
UNITED STATES PATENTS

| 3,390,195 | 6/1968 | Chappell et al. | 260—669 P |
| 3,641,176 | 2/1972 | Jenkins et al. | 260—671 A |
| 3,642,935 | 2/1972 | Dunning et al. | 260—683.15 D |

CURTIS R. DAVIS, Primary Examiner

U.S. Cl. X.R.

260—671 A, 669 P, 683.15 B, 683.15 D

UNITED STATES PATENT OFFICE
CERTIFICATE OF CORRECTION

Patent No. 3,732,323  Dated May 8, 1973

Inventor(s) Atsumu Osaki, Tsutomo Mizoroki and Ken-Ichi Maruya

It is certified that error appears in the above-identified patent and that said Letters Patent are hereby corrected as shown below:

Column 1, line 42: replace "in the industries" by --commercially-- line 44: replace "raw" by --starting-- line 44: replace "of the" by --for producing-- line 45: before "starting material" insert --useful as the-- line 45: before "of" insert --in the preparation-- line 46: before "important" insert --an-- line 46: replace "Nevertheless" by --However-- lines 46-47: replace "preferred" by --commercially feasible or practical-- line 48: replace "been found yet" by --yet been found-- line 49: cancel the comma after "2-phenylbutene"

Column 2, line 48: after "is" insert --a-- line 50: after "by" insert --a--

UNITED STATES PATENT OFFICE
CERTIFICATE OF CORRECTION

Patent No. 3,732,323                     Dated May 8, 1973

Inventor(s)   Osaki, et al

It is certified that error appears in the above-identified patent and that said Letters Patent are hereby corrected as shown below:

Column 2, line 51:  replace "Said" by --The aforesaid-- line 52:  insert a period after "art"

line 52:  replace "and, for " by --For-- line 52:  before "that" insert --it is well known-- line 54:  cancel "the"

line 54:  cancel "is also well known"

lines 51, 55 and 63:  replace "Said" by --The aforesaid-- line 63:  replace "dissolving them in" by --in a solution of-- line 64:  replace "Said solvent includes" by --Suitable solvents include-- line 66:  replace "a state" by --the form-- line 68:  replace "Preferred" by --Suitable-- line 71:  after "is" (first occurrence) insert --a--

-2-

UNITED STATES PATENT OFFICE
CERTIFICATE OF CORRECTION

Page 3

Patent No. 3,732,323   Dated May 8, 1973

Inventor(s) Osaki, et al

It is certified that error appears in the above-identified patent and that said Letters Patent are hereby corrected as shown below:

Column 3, line 6 : replace "of" by --in-- line 10: before " -aryl" insert --The--

Column 4, line 72: replace "Example" by --Examples--

Column 5, line 12: after "of" insert --an-- line 19: after "by" insert --a-- line 21: replace "halogen" by -- a halogen atom-- line 23: after "by" insert --a--

Column 1, line 50: correct the spelling of "rhodium"

Column 2, line 70: insert between "1-naphthyl" a dash (-)

Column 3, line 55: replace "Bf" by --Br--

Column 4, line 56: "1-$C_{10}H_7Ni[P(C_6H_5]_2I$) should read --

$1-C_{10}H_7Ni[P(C_6H_5)]_2I$) --

UNITED STATES PATENT OFFICE
CERTIFICATE OF CORRECTION

Patent No. 3,732,323        Dated May 8, 1973

Inventor(s) Atsumu Osaki, Tsutomo Mizoroki and Ken-Ichi Maruya

It is certified that error appears in the above-identified patent and that said Letters Patent are hereby corrected as shown below:

Page - 4

Column 1, line 16

Column 2, lines 38, 46, 55, 61, 68 and 69

Column 3, lines 4, 8, 10, 11, 16, 40,

Column 4, lines 72-73

Column 5, lines 12 and 19:  replace "$\phi$" by --$\phi$--

Column 1, line 34: replace "2-phenyl butyldiene" by -- 2-phenylbutadiene--.

Column 3, line 55: replace "(trans-0-$C_6H_4$($CH_3$) Ni[P-($CH_6H_5$)$_3$]$_2$Bf)" by --(trans-0-$C_6H_4$($CH_3$)Ni[P($C_6H_5$)$_3$]$_2$Br)--

Column 4, line 20: replace "I" by --1--

Column 4, line 56: replace "1-$C_{10}H_7$Ni[P($C_6H_5$]$_2$I)" by --1-$C_{10}H_7$Ni[P($C_6H_5$)]$_2$I)--

Column 4, line 71: before "32" insert --(--

Signed and sealed this 15th day of April 1975.

(SEAL)
Attest:

RUTH C. MASON
Attesting Officer

C. MARSHALL DANN
Commissioner of Patents
and Trademarks